US012513454B2

(12) United States Patent
Kawamura et al.

(10) Patent No.: US 12,513,454 B2
(45) Date of Patent: Dec. 30, 2025

(54) LOUDSPEAKER DEVICE

(71) Applicant: Panasonic Intellectual Property Corporation of America, Torrance, CA (US)

(72) Inventors: Akihisa Kawamura, Osaka (JP); Shuji Saiki, Nara (JP); Satoshi Takayama, Mie (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 202 days.

(21) Appl. No.: 18/239,343

(22) Filed: Aug. 29, 2023

(65) Prior Publication Data

US 2023/0412971 A1 Dec. 21, 2023

Related U.S. Application Data

(63) Continuation of application No. PCT/JP2022/005073, filed on Feb. 9, 2022.

(30) Foreign Application Priority Data

Mar. 4, 2021 (JP) ................................ 2021-034726

(51) Int. Cl.
*H04R 1/28* (2006.01)
*H04R 1/02* (2006.01)
*H04R 1/24* (2006.01)

(52) U.S. Cl.
CPC ........... *H04R 1/2811* (2013.01); *H04R 1/025* (2013.01); *H04R 1/24* (2013.01); *H04R 1/288* (2013.01)

(58) Field of Classification Search
CPC ........ H04R 1/2811; H04R 1/025; H04R 1/24; H04R 1/288
USPC ........................................................ 381/353
See application file for complete search history.

(56) References Cited

U.S. PATENT DOCUMENTS

| | | | |
|---|---|---|---|
| 5,012,890 | A | 5/1991 | Nagi et al. |
| 2018/0279039 | A1 | 9/2018 | Matsumura et al. |
| 2020/0177988 | A1 | 6/2020 | Zastoupil et al. |

FOREIGN PATENT DOCUMENTS

| | | |
|---|---|---|
| JP | 55-72384 | 5/1980 |
| JP | 64-889 | 1/1989 |
| JP | 1-241297 | 9/1989 |
| JP | 2-312393 | 12/1990 |

(Continued)

OTHER PUBLICATIONS

International Search Report (ISR) issued on May 17, 2022 in International (PCT) Application No. PCT/JP2022/005073.

(Continued)

*Primary Examiner* — Sean H Nguyen
(74) *Attorney, Agent, or Firm* — Wenderoth, Lind & Ponack, L.L.P.

(57) ABSTRACT

A loudspeaker device includes: a first loudspeaker unit; a first cabinet that supports the first loudspeaker unit; a second loudspeaker unit that is disposed on a sound-emitting side of the first loudspeaker unit, and emits sound in a same direction as a direction in which the first loudspeaker unit emits sound; a second cabinet that is disposed between the first loudspeaker unit and the second loudspeaker unit, and supports the second loudspeaker unit; and a resonator that is disposed between the first loudspeaker unit and the second cabinet, and includes an opening that opens toward a diaphragm of the first loudspeaker unit.

11 Claims, 8 Drawing Sheets

(56) References Cited

FOREIGN PATENT DOCUMENTS

| | | |
|---|---|---|
| JP | 7-7779 | 1/1995 |
| JP | 2018-164243 | 10/2018 |
| WO | 2008/139524 | 11/2008 |

OTHER PUBLICATIONS

Extended European Search Report issued Jul. 15, 2024 in corresponding European Patent Application No. 22762923.5.

LOUDSPEAKER DEVICE

CROSS REFERENCE TO RELATED APPLICATIONS

This is a continuation application of PCT International Application No. PCT/JP2022/005073 filed on Feb. 9, 2022, designating the United States of America, which is based on and claims priority of Japanese Patent Application No. 2021-034726 filed on Mar. 4, 2021. The entire disclosures of the above-identified applications, including the specifications, drawings and claims are incorporated herein by reference in their entirety.

FIELD

The present disclosure relates to a loudspeaker device, and in particular, to a loudspeaker device in which a second loudspeaker unit is disposed in front of a first loudspeaker unit.

BACKGROUND

Conventionally, there is a so-called coaxial loudspeaker device in which a pair of loudspeaker units are disposed on the same axis. In order to adjust the frequency response of such a loudspeaker device, a technique in which a Helmholtz resonator is disposed between the pair of loudspeaker units has been proposed (Patent Literature (PTL) 1, for example).

CITATION LIST

Patent Literature

PTL 1: Japanese Unexamined Patent Application Publication No. 2018-164243

SUMMARY

Technical Problem

However, in conventional coaxial loudspeaker devices, a complex structure is needed to reduce cross-modulation distortion, and effectively reducing cross-modulation distortion with a simple structure is difficult.

The present disclosure was conceived based on knowledge obtained as a result of repeated, diligent experimentation and research carried out by the inventors regarding the above-mentioned difficulties, and provides a loudspeaker device that can reduce cross-modulation distortion with a simple configuration.

Solution to Problem

A loudspeaker device according to one aspect of the present disclosure includes: a first loudspeaker unit; a first cabinet that supports the first loudspeaker unit; a second loudspeaker unit that is disposed on a sound-emitting side of the first loudspeaker unit, and emits sound in a same direction as a direction in which the first loudspeaker unit emits sound; a second cabinet that is disposed between the first loudspeaker unit and the second loudspeaker unit, and supports the second loudspeaker unit; and a resonator that is disposed between the first loudspeaker unit and the second cabinet, and includes an opening that opens toward a diaphragm of the first loudspeaker unit.

Advantageous Effects

According to the present disclosure, it is possible to adjust frequency response and effectively reduce cross-modulation distortion, or the like, with a simple configuration.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, an embodiment of a loudspeaker device according to the present disclosure will be described with reference to the drawings. It should be noted that the following embodiment is merely an example for describing the present disclosure, and is not intended to limit the scope of the present disclosure. For example, the shapes, structures, materials, elements, relative positional relationships, connection states, numerical values, formulas, and details of each of the steps and the order of the steps of the methods, and the like, described in the following embodiment are mere examples, and may include details that are not included in the following descriptions. Furthermore, although there are cases where geometric expressions, such as “parallel” and “orthogonal”, are used, these expressions are not mathematically precise indications and include substantially permissible error, deviation, and the like. Moreover, expressions, such as “simultaneous” and “identical (or the same)”, are considered to cover a substantially permissible range of meaning.

Additionally, the drawings are schematic illustrations, which may include emphasis, omission, or adjustment of proportion as necessary for the purpose of illustrating the present disclosure, and thus the shapes, positional relationships, and proportions shown may be different from actuality.

Furthermore, hereinafter, multiple aspects of the present disclosure may be comprehensively described as a single embodiment. Moreover, part of the contents in the description below describes optional elements related to the present disclosure.

Figure 1:
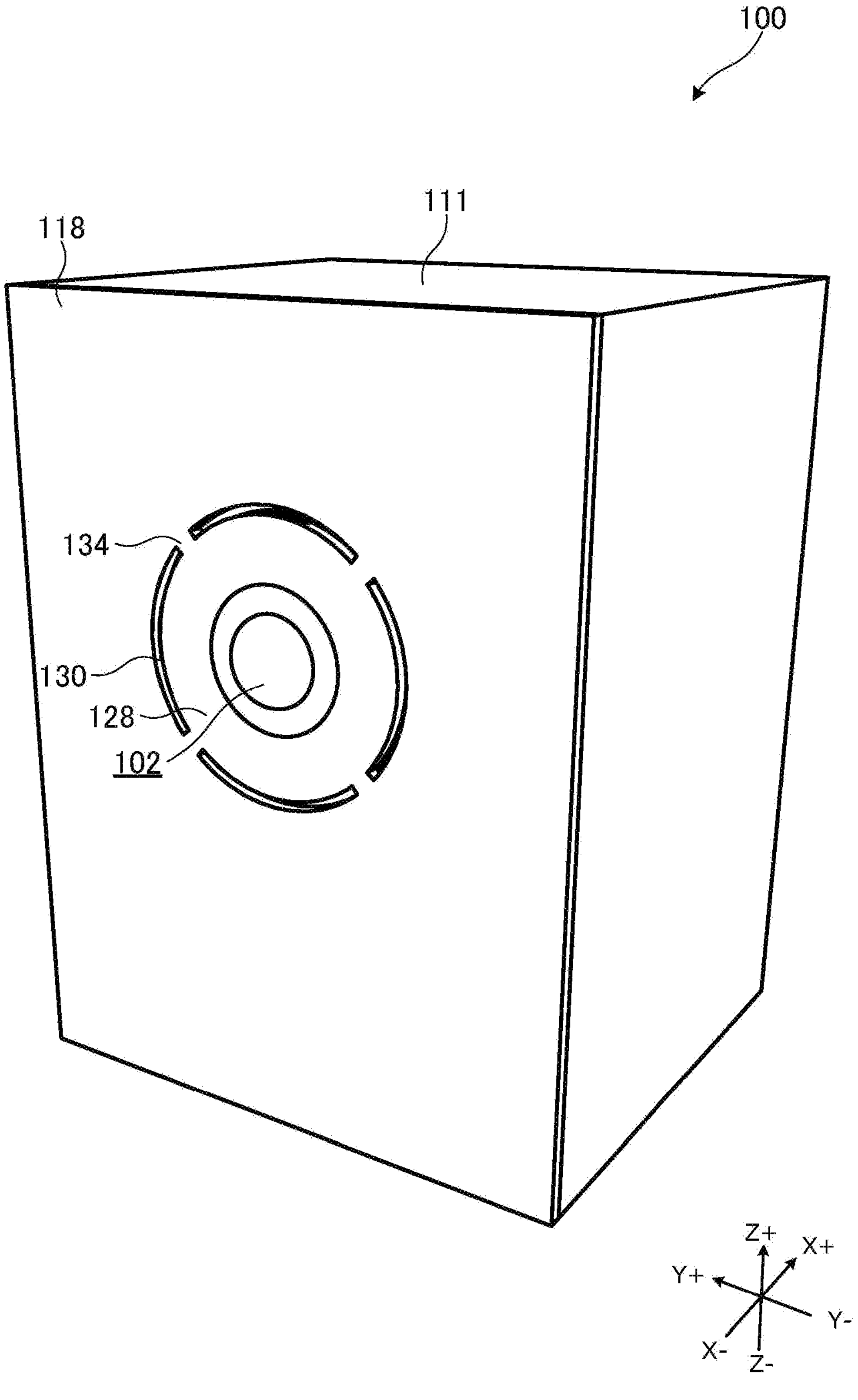
FIG. 1 is a perspective view of the external appearance of a loudspeaker device according to an embodiment.
Figure 2:
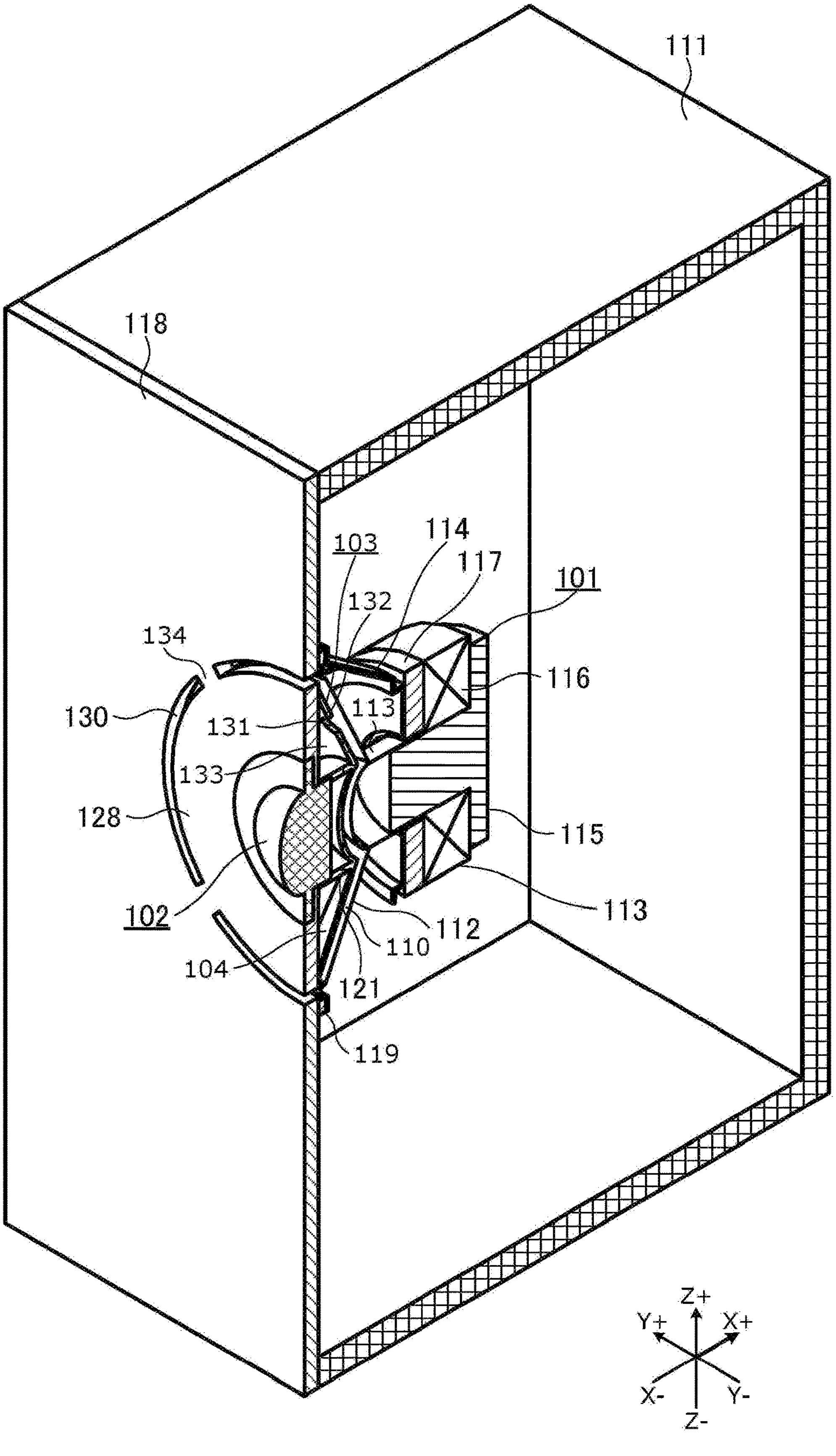
FIG. 2 is a cross-sectional perspective view illustrating the interior of the loudspeaker device according to the embodiment.

FIG. 1 is a perspective view of the external appearance of the loudspeaker device according to the embodiment. FIG. 2 is a cross-sectional perspective view illustrating the interior of the loudspeaker device according to the embodiment.

Figure 3:
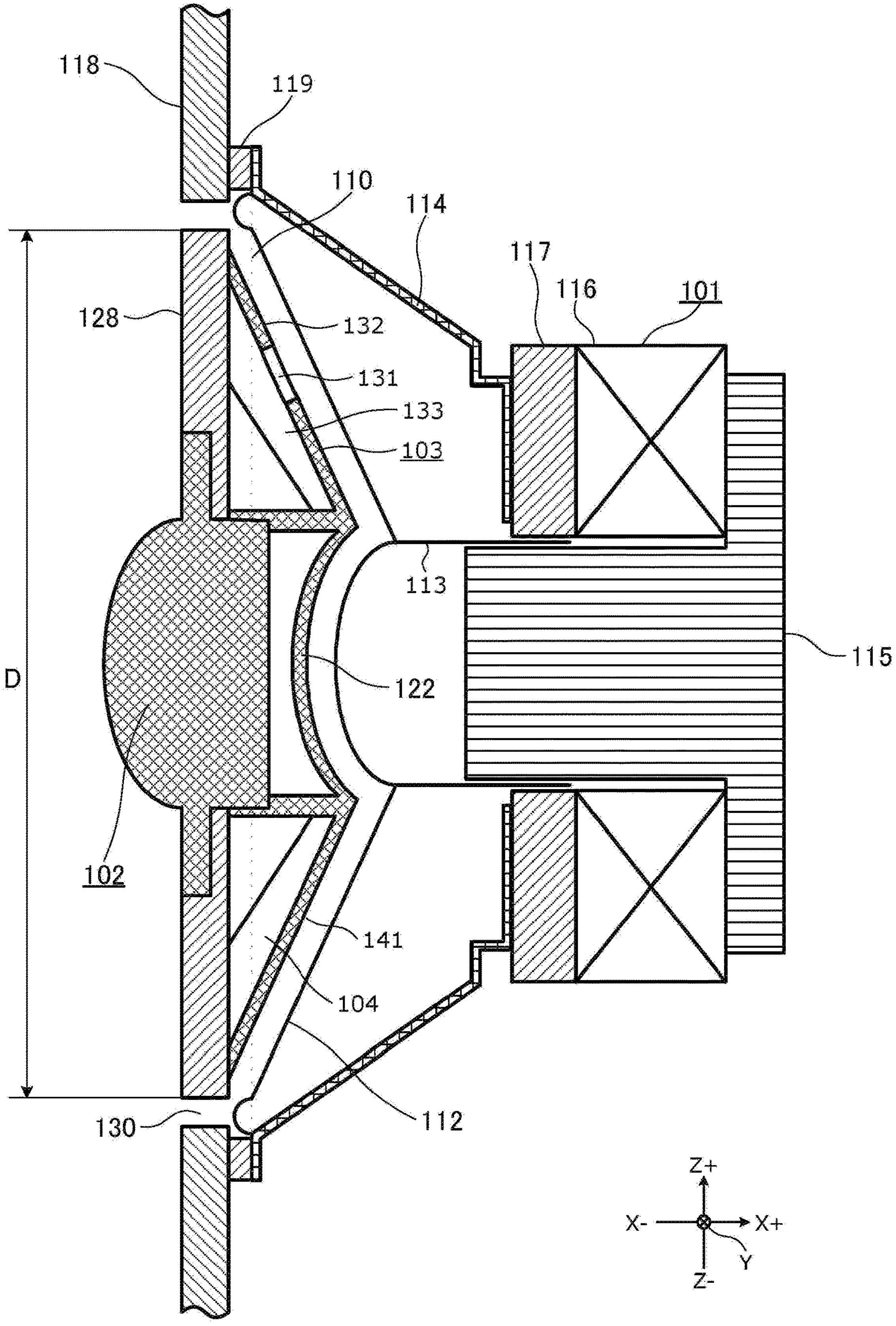
FIG. 3 is a cross-sectional view of a loudspeaker unit portion of the loudspeaker device according to the embodiment.

FIG. 3 is a cross-sectional view of a loudspeaker unit portion of the loudspeaker device according to the embodiment.

As shown in these figures, loudspeaker device 100 is a loudspeaker in which two loudspeaker units are arranged in a row along the front-back direction (X-axis direction in the figures), and includes first loudspeaker unit 101, second loudspeaker unit 102, first cabinet 111, second cabinet 121, and resonator 103.

First loudspeaker unit 101 is a loudspeaker designed to emit sound of a lower range than second loudspeaker unit 102, and includes a vibration system that includes diaphragm 112 and voice coil 113, a magnetic circuit that includes yoke 115, magnet 116, and plate 117, and frame 114 that holds the vibration system and the magnetic circuit.

Although the first loudspeaker unit is not limited to any particular shape (structure), in the present embodiment, diaphragm 112 included in first loudspeaker unit 101 has a conical shape (cone type). A dome-shaped cap that protrudes forward (toward the X-direction in the figures) is attached to the center of diaphragm 112.

First cabinet 111 is a box-shaped component that supports first loudspeaker unit 101 in a predetermined position, and functions to perform adjustments by causing reverberations, or the like, for inverted phase vibrations of diaphragm 112 of first loudspeaker unit 101. In the present embodiment, first cabinet 111 houses first loudspeaker unit 101 and supports first loudspeaker unit 101 via first baffle board 118, which covers the front opening of first cabinet 111, and holding component 119. A circular penetrating hole corresponding to the external shape of diaphragm 112 is provided in the portion of first baffle board 118 located opposite first loudspeaker unit 101.

It should be noted that first cabinet 111 is not limited to any particular shape (structure), and may be a closed or bass reflex cabinet. Furthermore, first cabinet 111 may support first loudspeaker unit 101 using components other than first baffle board 118.

Second loudspeaker unit 102 is a loudspeaker that is disposed on the sound-emitting side of first loudspeaker unit 101, and emits sound in the same direction as first loudspeaker unit 101. Second loudspeaker unit 102 is a loudspeaker that is more compact than first loudspeaker unit 101, and is designed to emit sound of a higher range than first loudspeaker unit 101. In the same way as first loudspeaker unit 101, second loudspeaker unit 102 also includes a diaphragm, voice coil, frame, yoke, magnet, plate, and the like, however, these are omitted from the figures.

Although the winding axis of the voice coil of second loudspeaker unit 102 is not particularly limited to any direction, in the present embodiment, the winding axis of the voice coil of second loudspeaker unit 102 is disposed on the same axis as the winding axis of voice coil 113 of first loudspeaker unit 101. Furthermore, second loudspeaker unit 102 is disposed in front of diaphragm 112 of first loudspeaker unit 101 (X-direction in the figures), and is disposed to emit sound in the same direction as first loudspeaker unit 101. That is to say, loudspeaker device 100 according to the embodiment is a so-called coaxial loudspeaker device.

Although second loudspeaker unit 102 is not limited to any particular shape (structure), in the present embodiment, a dome-shaped loudspeaker is employed.

Second cabinet 121 is a box-shaped component that is disposed between diaphragm 112 of first loudspeaker unit 101 and second loudspeaker unit 102, and supports second loudspeaker unit 102. Second cabinet back panel 122 of second cabinet 121, which is located opposite first loudspeaker unit 101, is provided at a position that is just far enough so as not to interfere with diaphragm 112 even when diaphragm 112 of first loudspeaker unit 101 vibrates to emit sound. Accordingly, sound emitted from diaphragm 112 is effectively emitted outside of the baffle boards via sound path 110.

In the present embodiment, second cabinet 121 includes second baffle board 128 that is disposed on the inside of the circular penetrating hole provided in first baffle board 118, and which, together with first baffle board 118, forms annular-shaped slit 130. It should be noted that slit 130 is not completely annular, and is divided by connecting portions 134 that connect first baffle board 118 and second baffle board 128.

Slit 130 is in communication with sound path 110 formed between the diaphragm of first loudspeaker unit 101 on one side and second cabinet 121 and resonator 103 on the other, and sound emitted from diaphragm 112 of first loudspeaker unit 101 passes through sound path 110 and is emitted to the outside through slit 130.

In the present embodiment, diameter D of second baffle board 128 (see FIG. 3) is set to at least half a wavelength calculated from the low-range reproduction limit frequency of second loudspeaker unit 102. By setting it in this manner, the overall sound pressure characteristics of the sound emitted from slit 130 and the sound emitted from second loudspeaker unit 102 can be made to be flat. To provide a specific example, if the low-range reproduction limit frequency is fL=2,000 Hz, a 2,000 Hz wavelength can be represented as 344÷2,000=170 mm (344 is the speed of sound). Consequently, it is preferable that the diameter of second baffle board 128 is at least 85 mm, which is the diameter for half a wavelength.

Figure 8:
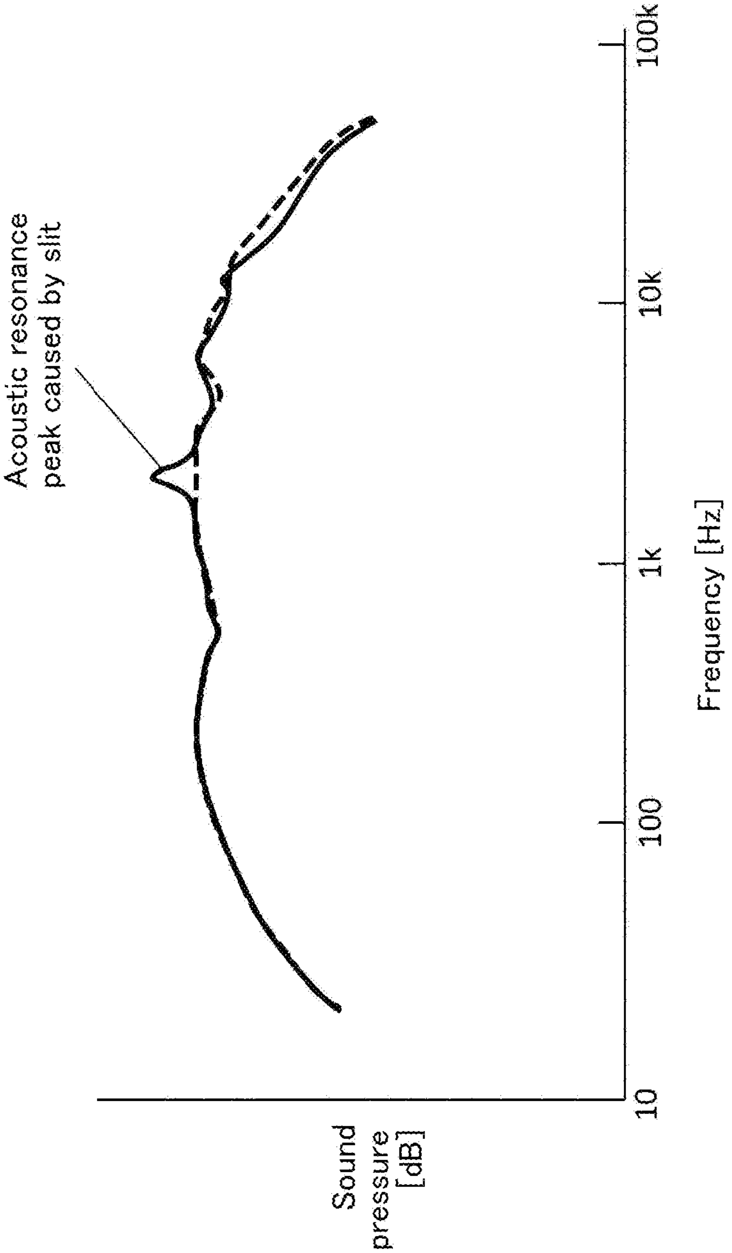
FIG. 8 is a graph illustrating the effects of the resonator.

Here, the low-range reproduction limit frequency is the limit frequency for which the loudspeaker unit can reproduce sound in the lower ranges, and as schematically shown in FIG. 8, frequency fL at which sound pressure suddenly drops when lowering the frequency of the sound being reproduced is the low-range reproduction limit frequency.

Furthermore, "diameter" is described in the present Description and the Claims as being twice the shortest distance among the distances measured from the point at which the axis of second loudspeaker unit 102 intersects with a plane including the front surface of second baffle board 128 up to the peripheral edge of second baffle board 128.

Additionally, by making the front surface of first baffle board 118 flush with the front surface of second baffle board 128, the acoustic characteristics can be improved. Moreover, second baffle board 128 is integrally formed with first baffle board 118. That is to say, first baffle board 118 and second baffle board 128 are formed by forming slit 130 that penetrates through in the thickness direction of a single board component.

Figure 4:
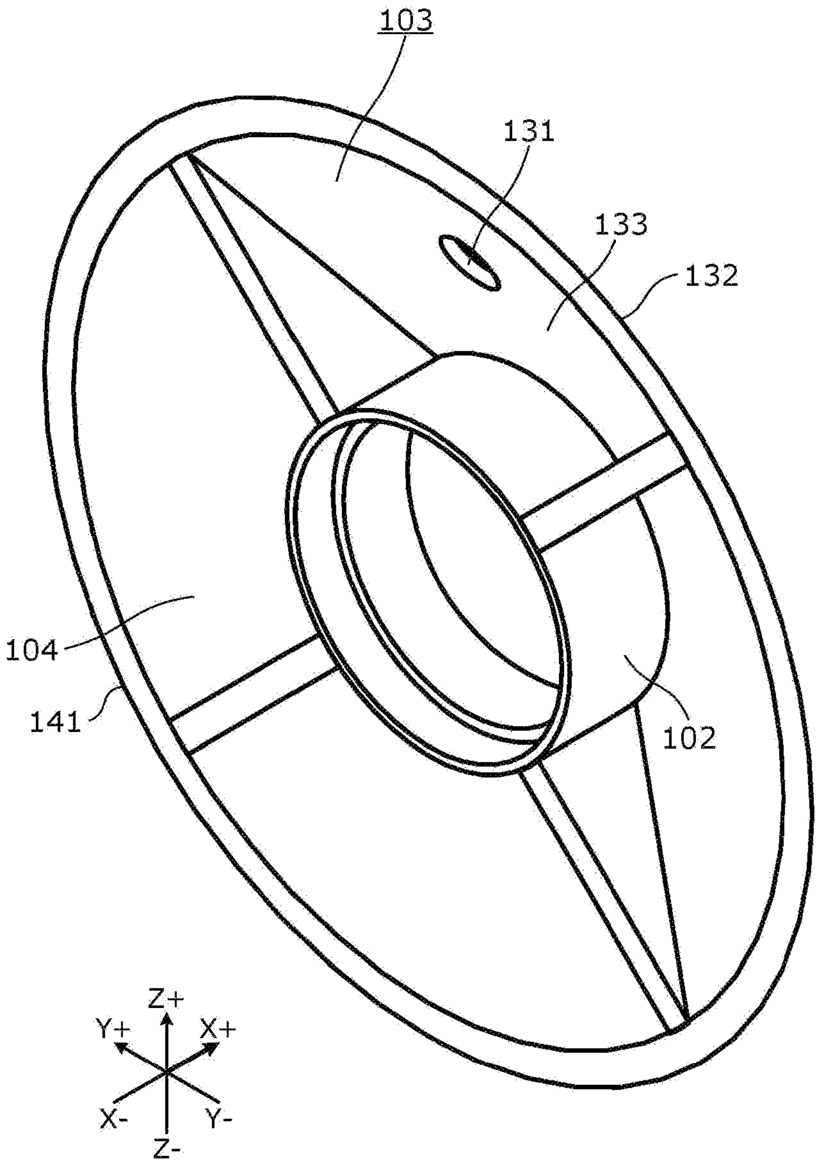
FIG. 4 is a perspective view of a resonator and a second cabinet according to the embodiment with baffle boards, and the like, omitted.

FIG. 4 is a perspective view of a resonator and a second cabinet with baffle board omitted. Resonator 103 is a Helmholtz resonator that is disposed between diaphragm 112 of first loudspeaker unit 101 and second cabinet 121, and includes opening 131 that opens toward diaphragm 112 of first loudspeaker unit 101.

In the present embodiment, resonator 103 includes, on the side opposite diaphragm 112 of first loudspeaker unit 101, resonator back panel 132 that conforms to the shape of diaphragm 112. Opening 131 is provided in resonator back panel 132. Specifically, resonator 103 is formed as one of the portions of a hollow, truncated-cone shape that conforms to the shape of diaphragm 112 of first loudspeaker unit 101 that has been divided at multiple locations in a radial direction.

Furthermore, the portions of the truncated-cone shape other than resonator 103 are dummy portions 104 that include, on the side opposite diaphragm 112 of first loudspeaker unit 101, dummy back panel 141 that conforms to the shape of diaphragm 112. Dummy portion 104 does not include opening 131 that opens toward diaphragm 112 of first loudspeaker unit 101. It should be noted that dummy portion 104 may be solid rather than hollow.

In the present embodiment, second cabinet 121 includes, on the side opposite diaphragm 112 of first loudspeaker unit 101, second cabinet back panel 122 (see FIG. 3) that conforms to the shape of diaphragm 112. Resonator back panel 132, dummy back panel 141, and second cabinet back panel 122 are provided at positions that are just far enough so as not to interfere with diaphragm 112 even when diaphragm 112 of first loudspeaker unit 101 vibrates to emit sound, and sound path 110 that communicates with slit 130 is formed by diaphragm 112 on one side, and resonator back panel 132, dummy back panel 141, and second cabinet back panel 122 on the other.

Resonator 103 forms resonant space 133 that communicates with sound path 110 via opening 131. In the present embodiment, resonant space 133 is formed by a portion of second cabinet 121, a portion of second baffle board 128, and resonator back panel 132. Second cabinet 121 and resonator back panel 132 are integrally formed. Furthermore, resonator 103 and dummy portion 104 are integrally formed.

Note that while resonator 103 has been described as forming resonant space 133 together with other components, resonant space 133 may be formed by resonator 103 alone.

The size of resonant space 133, which is formed in a closed-off state by resonator 103, as well as the size of opening 131, are arbitrarily determined to match the frequency at which resonance with sound passing through sound path 110 occurs, and resonator 103 need not form a resonant space 133 consisting of a portion of a hollow, truncated cone shape, as described in the present embodiment, and may form a resonant space 133 of any given shape.

As described above, speaker device 100 according to the present embodiment produces the advantageous effect of minimizing variation in sound quality due to listening position, as seen in sound emitted from a single-point sound source, while being able to suppress cross-modulation distortion and emit high-quality sound even with a simple configuration.

In particular, resonator 103 can effectively suppress acoustic resonance peaks caused by slit 130, such as that illustrated by the solid line in FIG. 8.

Furthermore, by forming resonator 103 by using a portion of second baffle board 128 and a portion of second cabinet 121, resonator 103 can be disposed in a narrow space between second baffle board 128 and diaphragm 112.

Additionally, by using a resonator back panel 132, second cabinet back panel 122, and dummy back panel 141 that conform to the shape of diaphragm 112, while disposing resonator 103 and second cabinet 121 in front of the sound-emitting side of first loudspeaker unit 101, sound from first loudspeaker unit 101 is more efficiently conducted by sound path 110, and cross-modulation distortion can more effectively be suppressed by resonator 103. Accordingly, sound for which distortion has been suppressed can be emitted from the slit with high efficiency.

Moreover, by disposing first loudspeaker unit 101 and second loudspeaker unit 102 on the same axis and emitting the sound that is generated by first loudspeaker unit 101 and emitted from slit 130 from a location that is a predetermined distance from second loudspeaker unit 102, cross-modulation distortion is suppressed in addition to the suppressive effects of resonator 103. Accordingly, the overall sound quality of sound emitted from speaker device 100 can be improved.

It should be noted that the present disclosure is not limited to the above embodiment. For example, other embodiments produced by arbitrarily combining or omitting some elements described in the present Description may be included as embodiments of the present disclosure. Moreover, the present disclosure includes variations obtained by various modifications to the above embodiment that can be conceived by those skilled in the art, so long as they do not depart from the essence of the present disclosure, that is, the intended meaning of the appended Claims.

Figure 5:
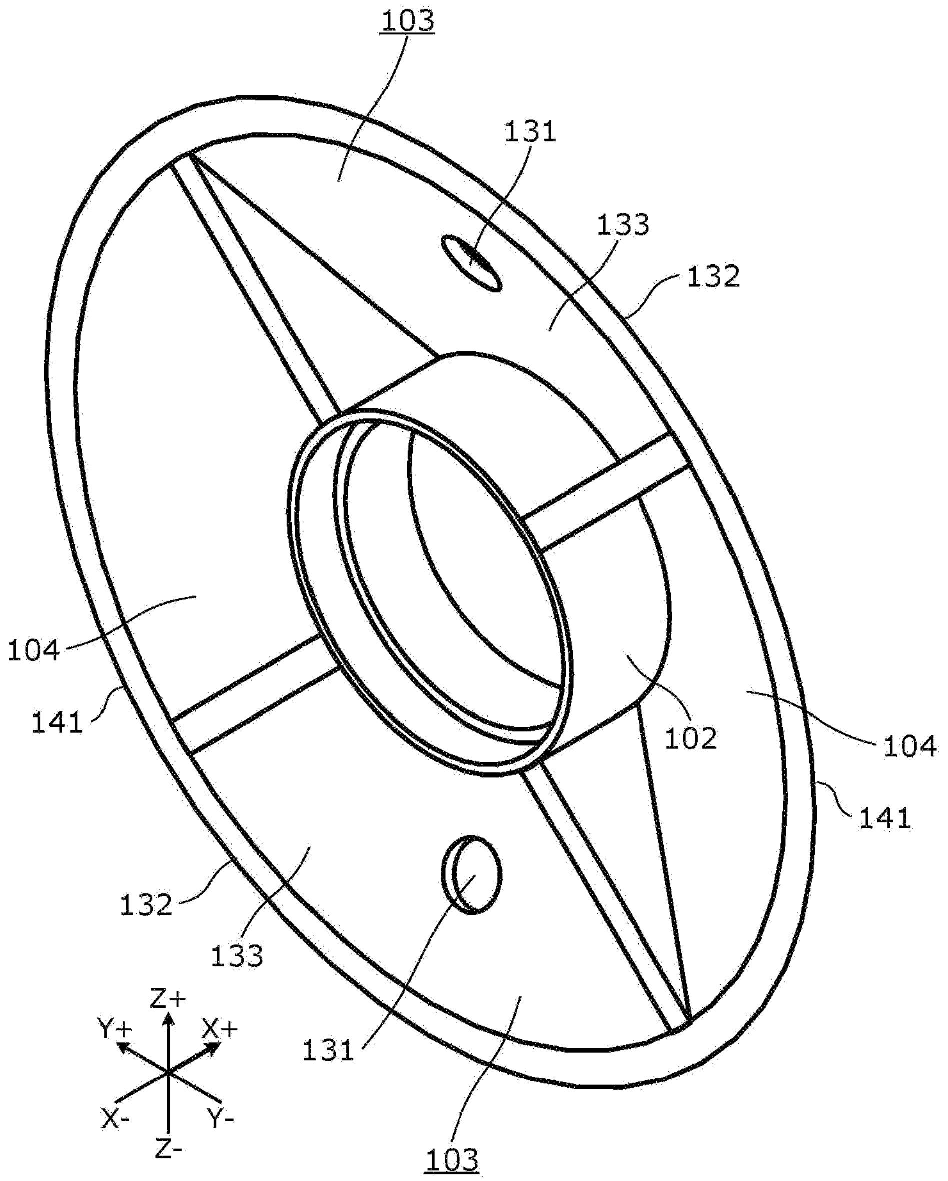
FIG. 5 is a perspective view of Example 1 of the resonator.

For example, loudspeaker device 100 may include a plurality of resonators 103 for the same resonant frequency as illustrated in FIG. 5. Accordingly, the advantageous effect of suppressing cross-modulation distortion can be enhanced.

Furthermore, openings 131 of the plurality of resonators 103 may be disposed symmetrically in relation to a plane including the winding axis of the voice coil, which is the arrangement direction in which first loudspeaker unit 101 and second loudspeaker unit 102 are arranged. Accordingly, the effects of resonator 103 can be evenly distributed in relation to diaphragm 112, and distortion during operation of diaphragm 112 can be inhibited.

Figure 6:
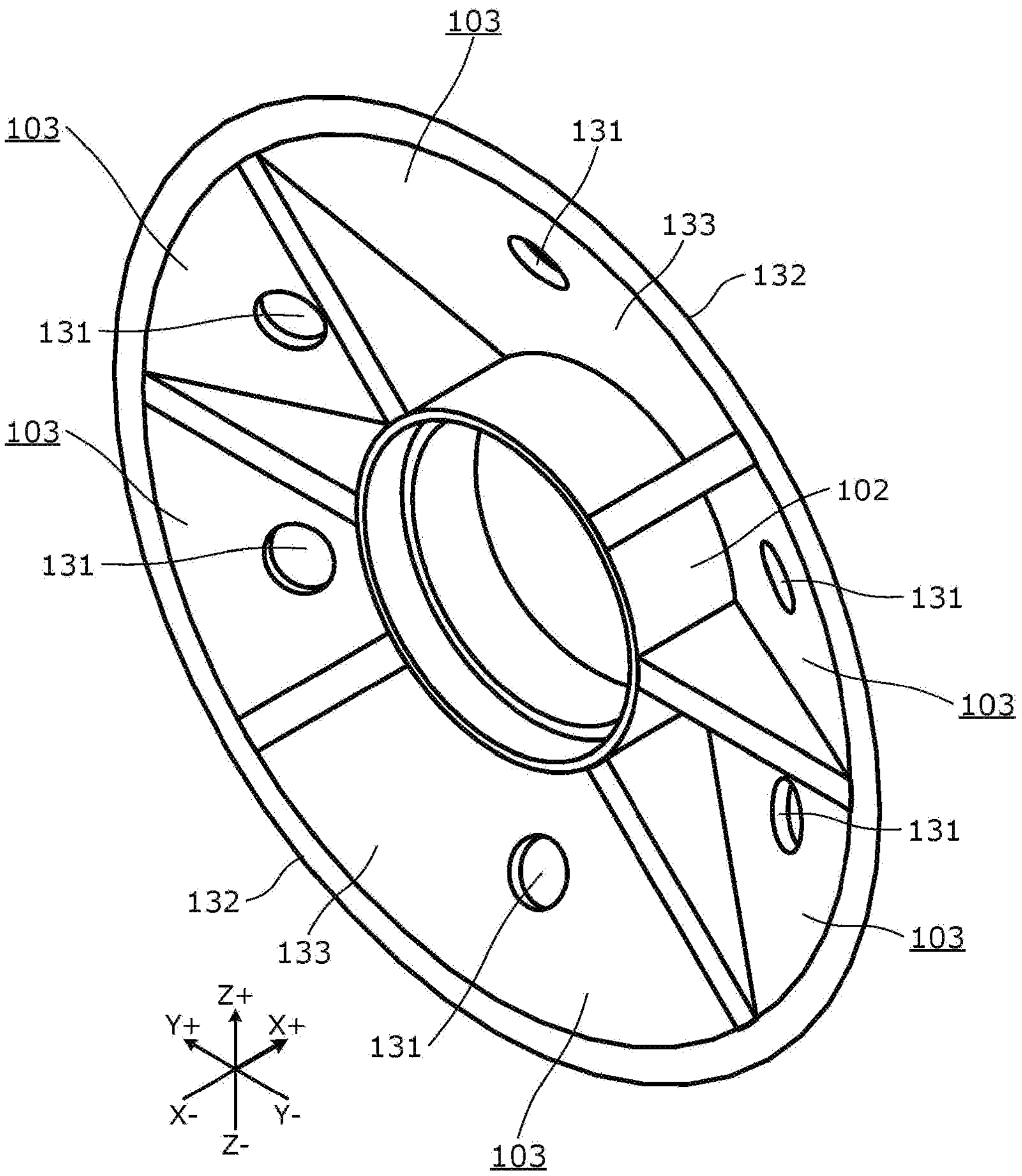
FIG. 6 is a perspective view of Example 2 of the resonator.
Figure 7:
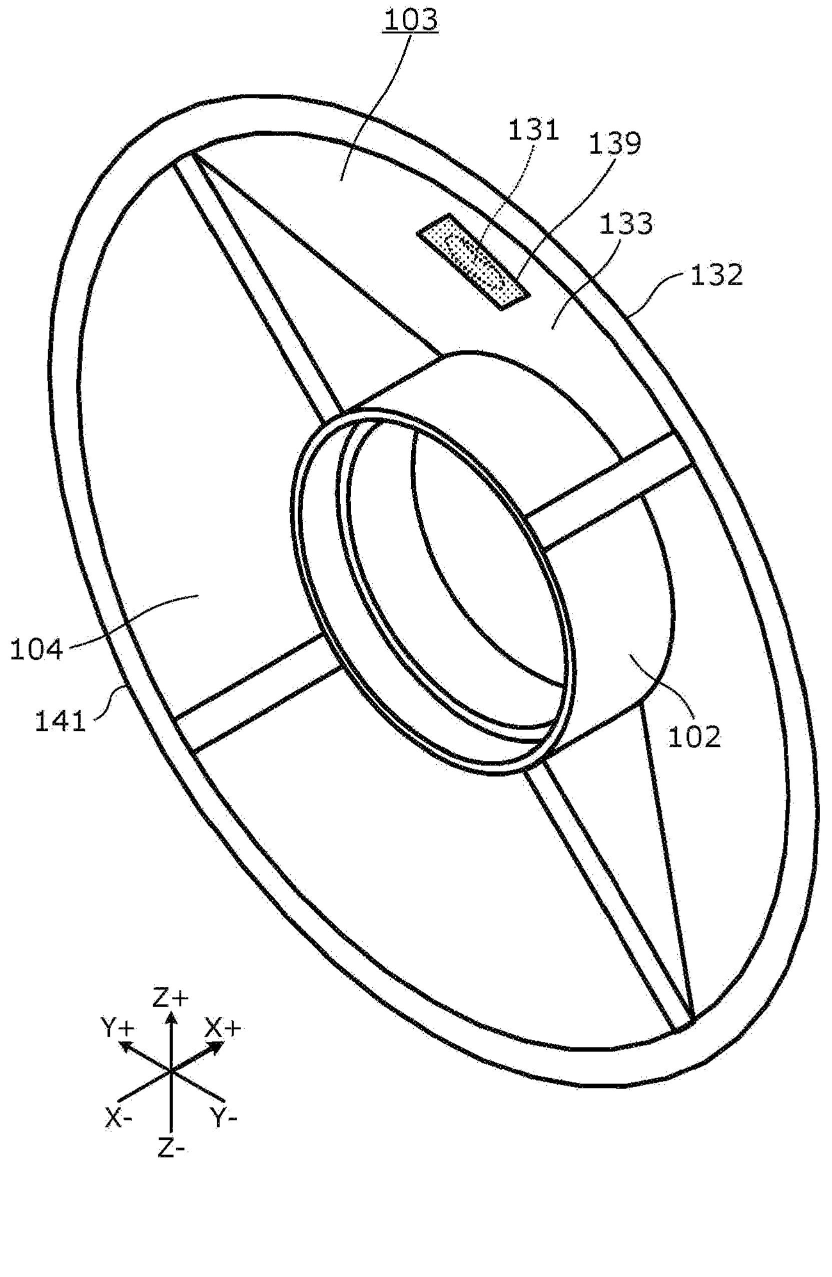
FIG. 7 is a perspective view of a resonator including an opening over which a damping cloth is attached.

Furthermore, loudspeaker device 100 may include a plurality of resonators 103 for different resonant frequencies as illustrated in FIG. 6.

Resonator 103 may include damping component 139. Damping component 139 is a component that amplifies acoustic resistance, and examples include a damping cloth, a sound absorbing material, and the like. By attaching a damping cloth to cover the opening of resonator 103 or by providing a sound absorbing material in resonant space 133, the degree of suppression of resonance caused by resonant space 133 can be controlled.

Furthermore, resonator 103 may be formed to be structurally separate from second cabinet 121, second baffle board 128, and the like.

Additionally, although diaphragm 112 of first loudspeaker unit 101 was described as being cone shaped and the diaphragm of second loudspeaker unit 102 was described as being dome shaped, diaphragms are not particularly limited to any shape, and plate-shaped diaphragms may be included. Moreover, diaphragms are not limited to circular or elliptical shapes, and may be rectangular.

Furthermore, although described as being separate, cabinets and baffle boards may be integrally formed. Moreover, first baffle board 118 and second baffle board 128 may be separate components joined by joining components, or the like.

Additionally, although first cabinet 111 was described as stand-alone housing, first cabinet 111 may be shared with the housing of an electronic device, such as a television or computer, and may be shared with the structure of a mobile body, such as an automobile or aircraft.

Moreover, loudspeaker device 100 may be used in compact, portable reproduction devices, such as headphones or in-ear headphones.

INDUSTRIAL APPLICABILITY

The present disclosure can be applied to a loudspeaker device 100 that reproduces audio signals of music and the like.

The invention claimed is:

1. A loudspeaker device comprising:

a first loudspeaker unit;

a first cabinet that supports the first loudspeaker unit;

a second loudspeaker unit that is disposed on a sound-emitting side of the first loudspeaker unit, and emits sound in a same direction as a direction in which the first loudspeaker unit emits sound;

a second cabinet that is disposed between the first loudspeaker unit and the second loudspeaker unit, and supports the second loudspeaker unit; and a resonator that is disposed between the first loudspeaker unit and the second cabinet, and includes an opening that opens toward a diaphragm of the first loudspeaker unit, wherein the resonator is configured from at least one region among regions obtained by dividing, at a plurality of locations in a radial direction, a hollow region that conforms to a shape of the diaphragm.

2. The loudspeaker device according to claim 1, wherein the first cabinet includes a first baffle board on a front face of the first cabinet, and the second cabinet includes a second baffle board that is disposed inside of a penetrating hole provided in the first baffle board, the second baffle board defining a slit with the first baffle board.

3. The loudspeaker device according to claim 1, wherein the resonator includes, on a side of the resonator which is opposite the diaphragm of the first loudspeaker unit, a resonator back panel that conforms to a shape of the diaphragm.

4. The loudspeaker device according to claim 3, further comprising:

a dummy portion that includes, on a side of the dummy portion which is opposite the diaphragm of the first loudspeaker unit, a dummy back panel that conforms to the shape of the diaphragm, the dummy portion including no opening that opens toward the diaphragm of the first loudspeaker unit.

5. The loudspeaker device according to claim 1, further comprising:

an other resonator for a resonant frequency identical to a resonant frequency of the resonator.

6. The loudspeaker device according to claim 5, wherein the opening of the resonator and an opening of the other resonator are disposed symmetrically in relation to a plane including an arrangement direction in which the first loudspeaker unit and the second loudspeaker unit are arranged.

7. The loudspeaker device according to claim 5, wherein the resonator is configured from a first region among the regions obtained by dividing the hollow region at the plurality of locations in the radial direction, and the other resonator is configured from a second region among the regions obtained by dividing the hollow region at the plurality of locations in the radial direction.

8. The loudspeaker device according to claim 1, further comprising:

an other resonator for a resonant frequency different from a resonant frequency of the resonator.

9. The loudspeaker device according to claim 8, wherein the opening of the resonator and an opening of the other resonator are disposed symmetrically in relation to a plane including an arrangement direction in which the first loudspeaker unit and the second loudspeaker unit are arranged.

10. The loudspeaker device according to claim 8, wherein the resonator is configured from a first region among the regions obtained by dividing the hollow region at the plurality of locations in the radial direction, and the other resonator is configured from a second region among the regions obtained by dividing the hollow region at the plurality of locations in the radial direction.

11. The loudspeaker device according to claim 1, wherein the resonator includes a damping component.

* * * * *